US008830044B2

(12) United States Patent
Fukamachi (10) Patent No.: US 8,830,044 B2
(45) Date of Patent: Sep. 9, 2014

(54) DRIVING SUPPORT DEVICE

(75) Inventor: Hideo Fukamachi, Hadano (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 169 days.

(21) Appl. No.: 13/641,298

(22) PCT Filed: Apr. 16, 2010

(86) PCT No.: PCT/JP2010/056848
§ 371 (c)(1),
(2), (4) Date: Oct. 15, 2012

(87) PCT Pub. No.: WO2011/129014
PCT Pub. Date: Oct. 20, 2011

(65) Prior Publication Data
US 2013/0033368 A1    Feb. 7, 2013

(51) Int. Cl.
*B60Q 1/00* (2006.01)
*B60W 50/00* (2006.01)
*G08G 1/16* (2006.01)
*B60W 40/09* (2012.01)
*B60W 30/08* (2012.01)

(52) U.S. Cl.
CPC ............... *G08G 1/16* (2013.01); *B60W 30/08* (2013.01); *B60W 50/0098* (2013.01); *B60W 2050/0089* (2013.01); *B60W 40/09* (2013.01)
USPC ........ 340/425.5; 340/435; 340/436; 340/438; 340/439; 340/465; 340/466; 340/467; 701/93; 701/96; 701/301

(58) Field of Classification Search
USPC .................................................... 340/425.5
See application file for complete search history.

(56) References Cited

U.S. PATENT DOCUMENTS

| 2004/0080405 | A1 | 4/2004 | Hijikata |
| 2006/0116807 | A1* | 6/2006 | Hijikata ......................... 701/96 |
| 2006/0145827 | A1* | 7/2006 | Kuge et al. .................... 340/439 |
| 2007/0276577 | A1* | 11/2007 | Kuge et al. .................... 701/96 |

FOREIGN PATENT DOCUMENTS

| JP | 2004183633 | 7/2004 |
| JP | 2009031837 | 2/2009 |

* cited by examiner

*Primary Examiner* — George Bugg
*Assistant Examiner* — Anthony D Afrifa-Kyei
(74) *Attorney, Agent, or Firm* — Kenyon & Kenyon LLP (57) ABSTRACT

Disclosed is a driving support device that is capable of realizing driving support in consideration of a risk potential determination tendency of a driver. The driving support device is a device that estimates a risk potential that is a degree of a risk with respect to a risk target in driving of a vehicle and performs a driving support for a driver of the vehicle on the basis of the estimated risk potential, and includes: a risk potential bias setting unit that sets a risk potential bias that is a value for changing the risk potential on the basis of a risk potential determination tendency of the driver; and a risk potential estimating unit that changes the risk potential on the basis of the risk potential bias set by the risk potential bias setting unit.

2 Claims, 11 Drawing Sheets

| DETECTION TARGET | RISK POTENTIAL BIAS |
|---|---|
| WIDTH OF CROSSING ROAD IS 30% OR LESS OF WIDTH OF TRAVELING ROAD | +a% |
| WIDTH OF CROSSING ROAD IS 80% TO 120% OF WIDTH OF TRAVELING ROAD | -b% |
| A STOP LINE IS PRESENT IN FRONT OF CROSSING POINT | +c% |
| CROSSING POINT A | +d% |
| CROSSING POINT B | -e% |
| ⋮ | ⋮ |

DRIVING SUPPORT DEVICE

This is a 371 national phase application of PCT/JP2010/056848 filed 16 Apr. 2010, the contents of which are incorporated herein by reference.

TECHNICAL FIELD

The present invention relates to a driving support device.

BACKGROUND ART

In the related art, a device is known that calculates a risk potential on the basis of a traveling situation such as a vehicle status and a traveling environment around a vehicle and performs driving support according to the calculated risk potential (for example, refer to Patent Literature 1).

CITATION LIST

Patent Literature

[Patent Literature 1] Japanese Unexamined Patent Application Publication No. 2004-183633

SUMMARY OF INVENTION

Technical Problem

In general, a driver of a vehicle subjectively determines a risk potential based on their senses and performs a driving operation while paying attention according to the determined risk potential. The subjective risk potential of the driver is changed to be high or low according to the experience of the driver, traffic environments or the like. In order to obtain an appropriate support by a device for performing a vehicle driving support, it is preferable that the subjective risk potential of the driver be considered in the calculation of the risk potential in the device.

An object of the invention is to provide a driving support device that is capable of realizing a driving support in consideration of a risk potential determination tendency of a driver.

Solution to Problem

According to an aspect of the invention, there is provided a driving support device that estimates a risk potential that is a degree of a risk with respect to a risk target in the driving of a vehicle and performs driving support for a driver of the vehicle on the basis of the estimated risk potential, including: risk potential bias setting means for setting a risk potential bias that is a value for changing the risk potential on the basis of a risk potential determination tendency of the driver; and risk potential estimation means for changing the risk potential on the basis of the risk potential bias set by the risk potential bias setting means.

In the driving support device according to this aspect of the invention, the risk potential bias is set on the basis of the risk potential determination tendency of the driver, and the risk potential is changed on the basis of the set risk potential bias. Accordingly, the determination tendency of the driver is reflected on the risk potential. Thus, it is possible to perform driving support in consideration of the risk potential determination tendency of the driver.

Further, in the driving support device according to this aspect of the invention, the risk potential bias setting means may set, in a case where the number of times that the vehicle travels through a specific point is equal to or greater than a predetermined number of times that is set in advance, the risk potential bias for increasing the risk potential relating to the specific point, and the risk potential estimation means may change the risk potential at the specific point into a greater value on the basis of the risk potential bias set by the risk potential bias setting means.

In general, in a case where a driver travels through a certain point a large number of times, the driver tends to estimate that a risk potential at the point is low. According to the above-mentioned configuration, in a case where the number of times that the vehicle travels through the specific point is equal to or greater than the predetermined number of times, the risk potential bias for increasing the value of the risk potential relating to the specific point is set, and the value of the risk potential is changed on the basis of the set risk potential bias. Accordingly, the tendency for the driver to estimate that the risk potential is low is reflected, and thus, it is possible to estimate an appropriate risk potential.

Further, in the driving support device according to this aspect of the invention, the risk potential bias setting means may set, in a case where the number of times that a driving operation for avoiding a risk at a specific point is performed by the driver is equal to or greater than a predetermined number of times that is set in advance, the risk potential bias for decreasing the risk potential relating to the specific point, and the risk potential estimation means may change the risk potential at the specific point into a smaller value on the basis of the risk potential bias set by the risk potential bias setting means.

At a point where a driver frequently performs a driving operation for avoiding a risk, there is a high possibility that the driver travels through the concerned point while paying excessive attention. According to the above-mentioned configuration, in a case where the number of times that the driving operation for avoiding the risk at the specific point is performed by the driver is equal to or greater than the predetermined number of times, the risk potential bias for decreasing the value of the risk potential relating to the specific point is set, and the value of the risk potential is changed on the basis of the set risk potential bias. Accordingly, the tendency for the driver to estimate that the risk potential is high is reflected, and thus, it is possible to estimate an appropriate risk potential.

Further, in the driving support device according to this aspect of the invention, the risk potential bias setting means may extract a characteristic relating to a traffic environment at the specific point and may set, in a case where a point different from the specific point has the characteristic relating to the traffic environment, the risk potential bias for decreasing the risk potential relating to the different point, and the risk potential estimation means may change the risk potential at the different point into a smaller value on the basis of the risk potential bias set by the risk potential bias setting means.

At a different point that has the same characteristic relating to a traffic environment as at a specific point where the number of times of driving operations of a driver for avoiding a risk is equal to or greater than a predetermined number of times, there is a high possibility that the driver travels through the concerned point while paying excessive attention in a similar way to the specific point. According to the above-mentioned configuration, at the different point that has the same characteristic relating to the traffic environment as at the specific point where the number of times of driving operations of the driver for avoiding the risk is equal to or greater than the predetermined number of times, the risk potential bias for decreasing the value of the risk potential is set, and the value of the risk potential at the different point is changed on the basis of the set risk potential bias.

Advantageous Effects of Invention

According to the driving support device according to the invention, it is possible to realize driving support in consideration of a risk potential determination tendency of a driver.

DESCRIPTION OF EMBODIMENTS

Hereinafter, preferred exemplary embodiments of the present invention will be described with reference to the accompanying drawings. In the following description, the same reference numerals are given to the same elements or elements having the same functions, and repetitive description thereof will be omitted.

First Exemplary Embodiment

Figure 1:
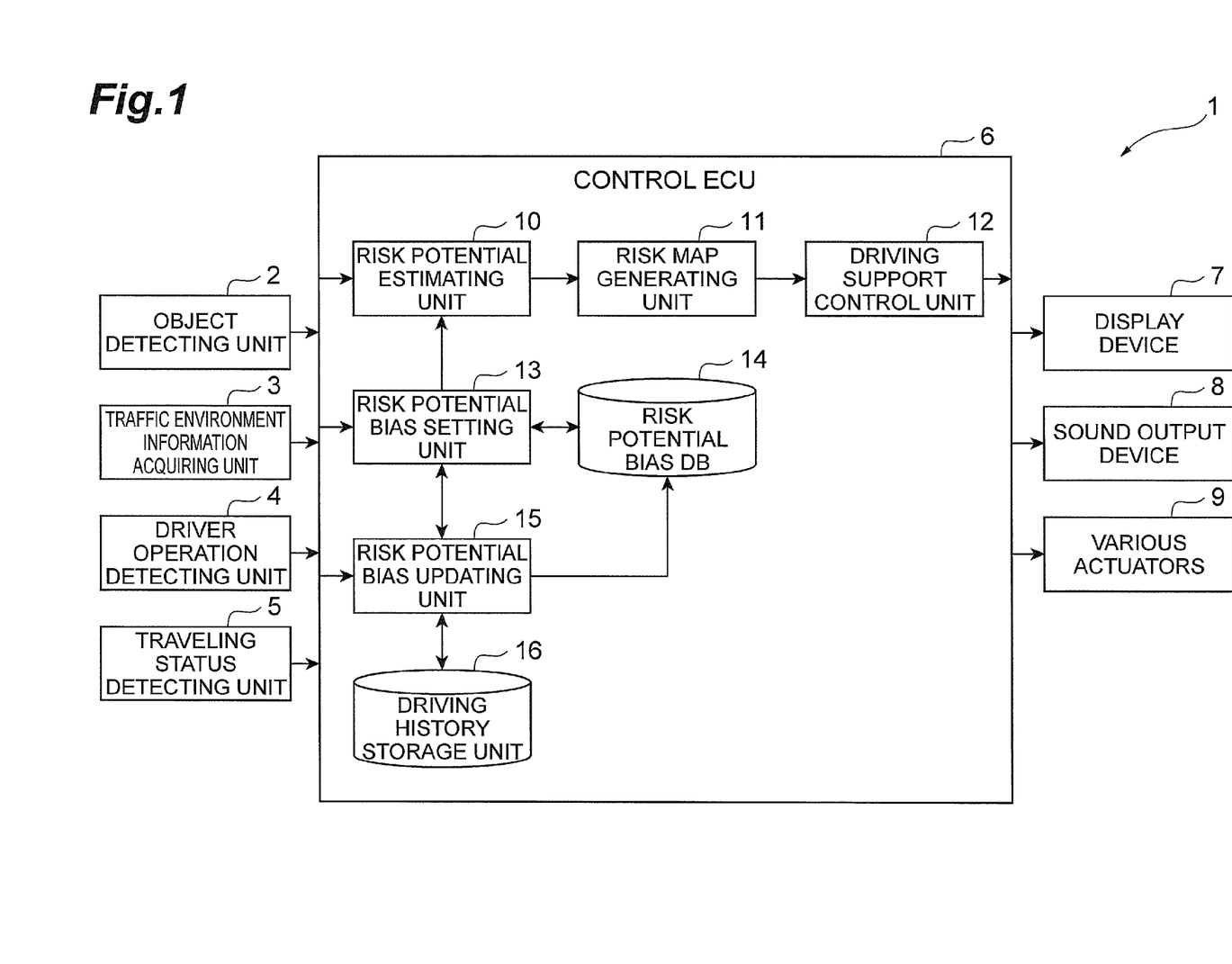
FIG. 1 is a configuration diagram illustrating a driving support device according to an exemplary embodiment of the invention.

FIG. 1 is a configuration diagram illustrating an exemplary embodiment of a driving support device according to the present invention. A driving support device 1 is a device that estimates a risk potential that is the degree of risk with respect to a risk target in driving a vehicle, and performs driving support for a driver of the vehicle on the basis of the estimated risk potential. The risk potential is an index value indicating a latent risk that a host vehicle collides with an object that is the risk target at each point. The risk potential is generated on the basis of the relative position of the host vehicle and the object, an operation status and the like.

More specifically, the driving support device 1 estimates the risk potential at each point on a route of the host vehicle and in the vicinity of the route, and generates a risk map on the basis of the estimated risk potential. The risk map is made by plotting the distribution of the risk potential on a two-dimensional map, and can express a region where the risk potential is present and, the height of the risk potential. Further, the driving support device 1 sets a target route on the basis of the risk map, and controls various devices provided for the driving support so that the vehicle travels along the set target route, to thereby perform the driving support.

As illustrated in FIG. 1, the driving support device 1 includes an object detecting unit 2, a traffic environment information acquiring unit 3, a driver operation detecting unit 4, a traveling status detecting unit 5, a control ECU (Electronic Control Unit) 6, a display unit 7, a sound output unit 8, and various actuators 9.

The object detecting unit 2 is a unit that detects an object that is a risk target in driving a vehicle, and is able to detect the presence or absence, the position and the velocity of the object. The object that is the risk target corresponds to a pedestrian, a vehicle, a different obstacle or the like that is present on a prediction route of the vehicle or in the vicinity of the prediction route. The prediction route is a route of the vehicle in a case where the vehicle maintains a current traveling status.

The object detecting unit 2 includes a radar device such as a millimeter wave radar or a laser radar. Here, the object detecting unit 2 may include a camera and image recognition processing means. The image recognition processing means includes a computer.

The object detecting unit 2 transmits the position, size and the like of the detected object to the control ECU 6 as object information. The object detected by the object detecting unit 2 includes a pedestrian, a stopped vehicle, a vehicle in an opposite lane, an obstacle that is present on the road, or the like, for example. That is, in addition to an object that is a direct risk target when driving a vehicle, an object that may affect movement of the risk object is also included in the object detected by the object detecting unit 2.

The traffic environment information acquiring unit 3 is a unit that acquires traffic environment information that is information relating to a traffic environment in the vicinity of the vehicle and the object. The traffic environment information acquiring unit 3 includes a camera, a radar device, an infrastructure information communication device or the like, for example. The infrastructure information communication device is a device that receives traffic environment information about a road on which a host vehicle is traveling from an infrastructure, may include a part of functions of a so-called a car navigation device, or may be provided as a separate communication device.

The traffic environment information acquiring unit 3 acquires information relating to traffic rules, the shape of the road, the presence or absence of structures on and beside the road, and the like, as traffic environment information. More specifically, the traffic environment information includes information relating to all traffic environments in the vicinity of the vehicle, in the vicinity of the prediction route of the vehicle, and in the vicinity of the object detected by the object detecting unit 2, for example, information about the position of a white line that forms a traffic lane, the presence or absence of a pedestrian crossing, a road sign that warns of the existence of the pedestrian crossing, and the presence or absence of a guardrail. The traffic environment information acquiring unit 3 transmits the acquired traffic environment information to the control ECU 6.

The driver operation detecting unit 4 is a unit that detects a driving operation of a driver, and for example, includes sensors that detect operation of an accelerator pedal, a brake pedal, steering and the like. The driver operation detecting unit 4 transmits information relating to the detected driving operation to the control ECU 6. Further, the driver operation detecting unit 4 is able to detect a status of the driver such as driver's eyes, or the presence or absence of sleepiness. In this case, the driver operation detecting unit 4 includes an imaging device such as a camera.

The traveling status detecting unit 5 is a unit that detects a traveling status of the vehicle, and includes sensors such as a wheel speed sensor, an acceleration sensor and a yaw rate sensor, for example. The traveling status detecting unit 5 detects the speed, acceleration, rotational speed or the like of the vehicle. The traveling status detecting unit 5 transmits information relating to the detected traveling status to the control ECU 6.

The control ECU 6 is a device that performs a driving support for avoiding the object that is a risk target by controlling the display unit 7, the sound output unit 8 and the various actuators 9 on the basis of the information acquired from the object detecting unit 2, the traffic environment information acquiring unit 3, the driver operation detecting unit 4 and the traveling status detecting unit 5, and includes a computer provided with a CPU, a storage device such as a ROM or a RAM, an input and output interface and the like.

The control ECU 6 includes a risk potential estimating unit 10 (risk potential estimation means), a risk map generating unit 11, a driving support control unit 12, a risk potential bias setting unit 13 (risk potential bias setting means), a risk potential bias DB 14 (risk potential bias setting means), a risk potential bias updating unit 15 (risk potential bias setting means), and a driving history storage unit 16 (risk potential bias setting means).

The risk potential estimating unit 10 is a unit that estimates a risk potential on the basis of various pieces of information acquired from the object detecting unit 2 and the traffic environment information acquiring unit 3. The risk potential estimating unit 10 transmits the estimated risk potential information to the risk map generating unit 11.

Further, the risk potential estimating unit 10 changes the risk potential on the basis of the risk potential bias set by the risk potential bias setting unit 13. Specifically, the risk potential estimating unit 10 increases or decreases the risk potential estimated on the basis of the information from the object detecting unit 2 and the traffic environment information acquiring unit 3, on the basis of the risk potential bias.

Figure 2:
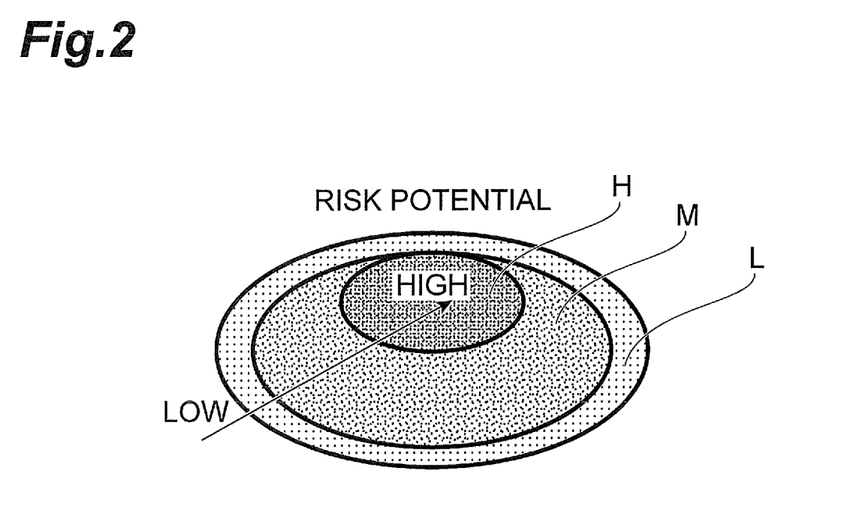
FIG. 2 is a diagram illustrating an explanatory note for illustrating a region where a risk potential is present in a risk map and the height of the risk potential in the region.

The risk map generating unit 11 is a unit that generates a risk map on the basis of the risk potential at each point acquired from the risk potential estimating unit 10. The risk map is made by plotting the distribution of the risk potential on a two-dimensional map, and is able to represent a region where the risk potential is present and the height of the risk potential in the region. FIG. 2 is a diagram illustrating an explanatory note for illustrating a region where a risk potential is present in a risk map and the height of the risk potential in the region. As illustrated in FIG. 2, a risk potential region that is the region where the risk potential is present includes plural levels according to the risk potential, which includes three levels of a low risk potential region L, an intermediate risk potential region M and a high risk potential region H.

Figure 3:
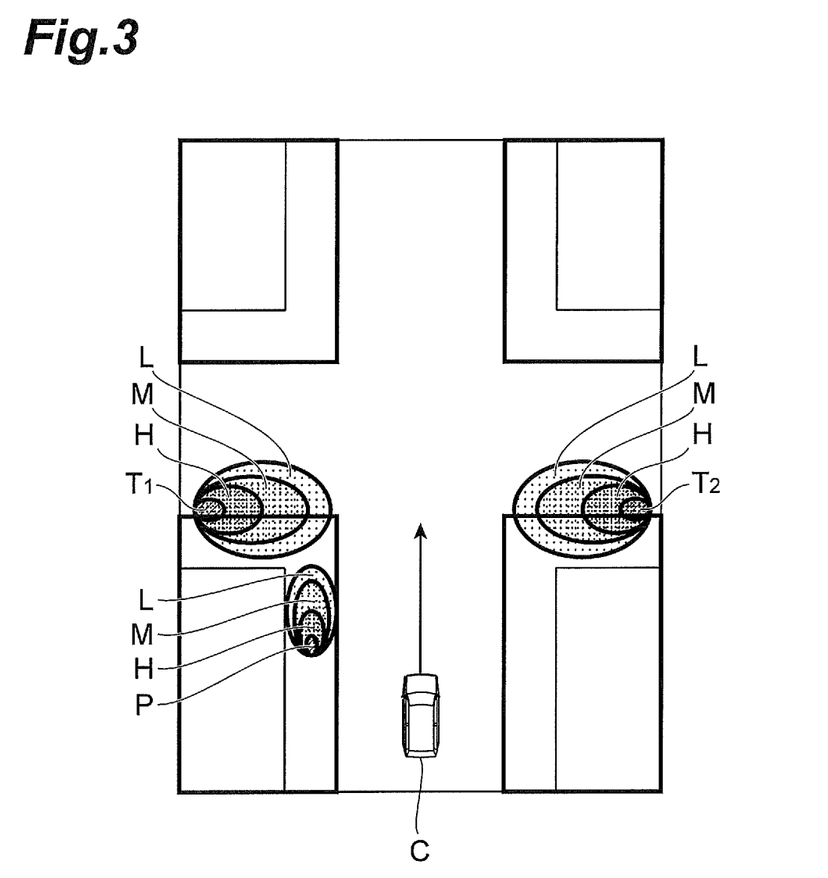
FIG. 3 is a diagram illustrating an example of a risk map generated by a risk map generating unit.

FIG. 3 is a diagram illustrating an example of a risk map generated by the risk map generating unit 11. As illustrated in FIG. 3, the risk map represents risk potential regions L, M and H for respective objects such as a pedestrian P, a risk body $T_1$ or a risk body $T_2$ that is present in a preceding direction of a vehicle C. The risk body $T_1$ and the risk body $T_2$ represent blind spot regions in the vehicle C as virtual objects.

Further, the risk map generating unit 11 generates a target route of the vehicle on the basis of a region where the risk potential is not present or low in front of the vehicle. Further, the risk map generating unit 11 transmits information relating to the target route of the vehicle to the driving support control unit 12.

The driving support control unit 12 is a unit that determines the type of driving support on the basis of the information relating to the target route acquired from the risk map generating unit 11 and controls the devices including the display unit 7, the sound output unit 8 and the various actuators 9 to thereby perform the driving support. Further, the driving support control unit 12 calculates a control variable of each device in each driving support type. As the driving support type, for example, information provision, alert, avoidance guidance, avoidance control and alarm generation are included.

In the "information provision" as the driving support, in order to cause a driver to recognize the existence of an object, the object is highlighted on the display unit 7. In the "alert" serving as the driving support, the object is more highlighted compared with the case of "information provision" to be displayed on the display unit 7, and an alarm sound is generated by the sound output unit 8.

In the "avoidance guidance" as the driving support, the steering, the brake pedal and the acceleration pedal of vehicle C are driven in a direction where the vehicle C avoids the object. In the "avoidance control" as the driving support, the vehicle is forcibly decelerated or is changed in route. In the "alarm generation" as the driving support, an alarm sound is output from the sound output unit 8.

The risk potential bias setting unit 13 is a unit that sets a risk potential bias that is a value for changing a risk potential on the basis of a risk determination tendency of a driver. The driver may subjectively estimate that the risk potential is higher or lower than a risk potential based on an objective event. That is, the risk determination tendency of the driver represents a characteristic of the driver of generating deviation of the risk potential that is subjectively estimated with respect to the objective risk potential.

Specifically, the risk potential bias setting unit 13 detects various events relating to the object, traffic environment, driver and traveling status, from the object detecting unit 2, the traffic environment information acquiring unit 3, the driver operation detecting unit 4 and the traveling status detecting unit 5. Further, the risk potential bias setting unit 13 extracts and sets a risk potential bias corresponding to the detected events with reference to the risk potential bias DB 14.

Figure 4:
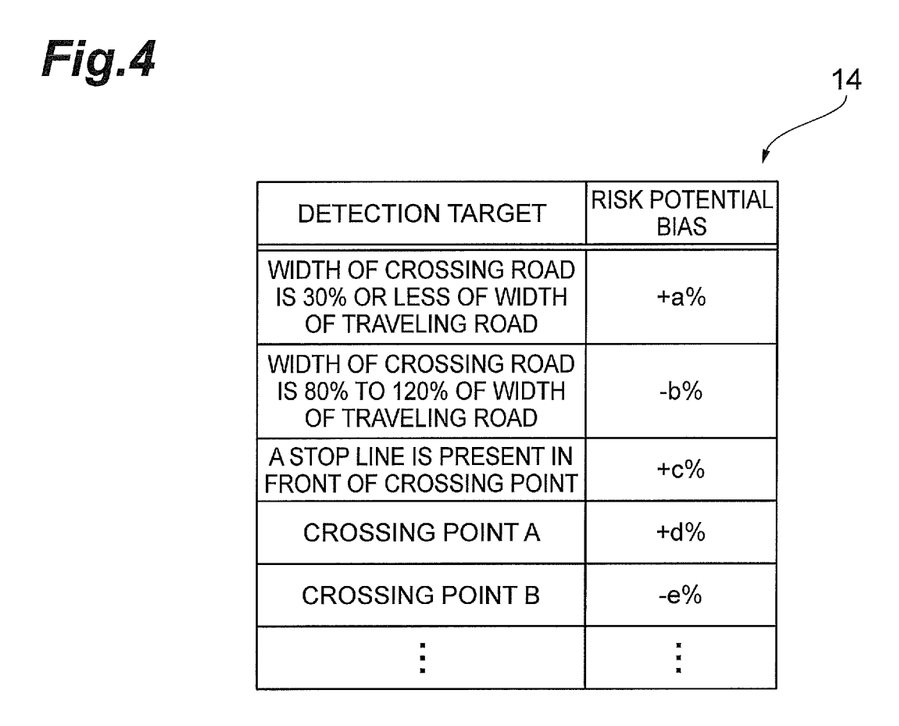
FIG. 4 is a diagram illustrating an example of a configuration of a risk bias DB and data stored therein.

The risk potential bias DB 14 is a database referenced by the risk potential bias setting unit 13, in order to set the risk potential bias on the basis of the detected events. The risk potential bias DB 14 in FIG. 4 stores the risk potential bias and the detected events to be matched with each other. Specifically, the risk potential bias DB 14 stores events on which the driver tends to estimate that the risk potential is low or high as the detected events. Further, the risk potential bias DB 14 stores a risk potential bias for correcting the risk estimation tendency of the driver and each detected event to be matched with each other.

Figure 5:
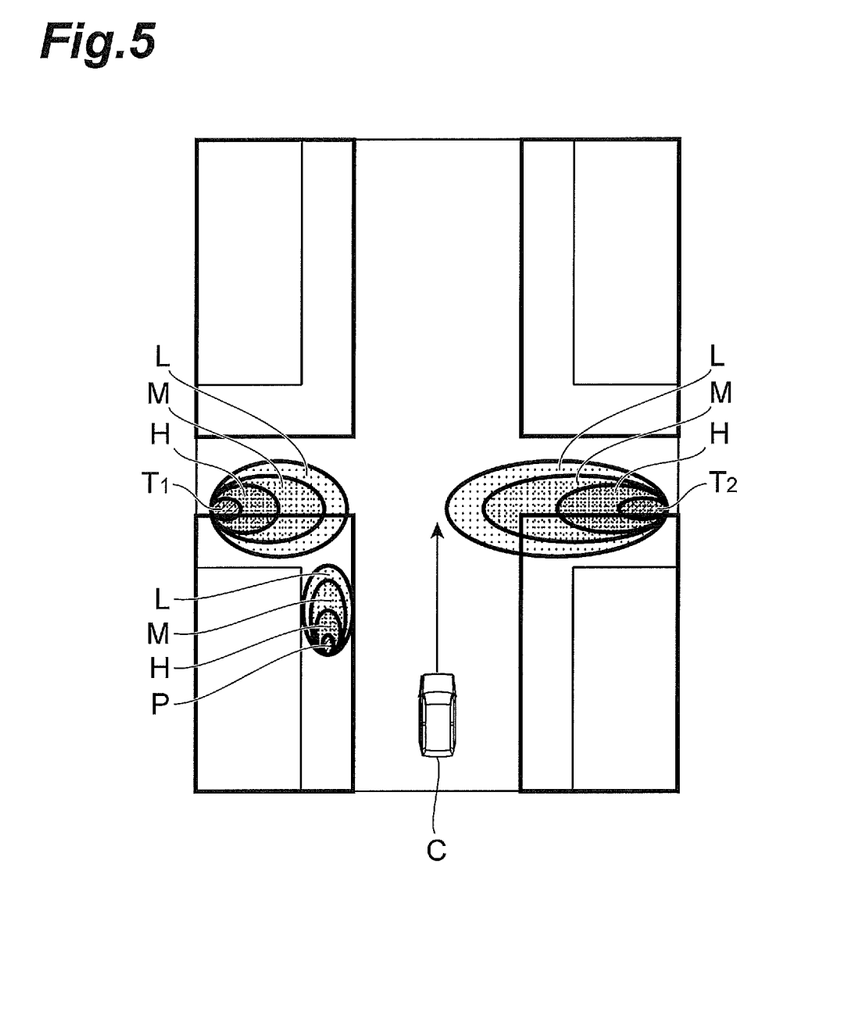
FIG. 5 is a diagram illustrating an example of a risk map in a case where a risk potential bias setting unit detects that "the width of a crossing road is 30% or less of the width of a traveling road" as a detected event.

For example, in the case of "the width of a crossing road is 30% or less of the width of a traveling road", the driver tends to estimate that the risk potential at the point is low, and thus, the risk potential bias is set to "+a %". FIG. 5 is a diagram illustrating an example of a risk map in a case where the risk potential bias setting unit 13 detects that "the width of a crossing road is 30% or less of the width of a traveling road" as a detected event. In this case, since the risk potential bias setting unit 13 sets the risk potential bias to "+a %", the risk potential estimating unit 10 changes the risk potential to a higher value according to the set risk potential bias. Accordingly, the risk potential regions L, M and H relating to the risk body $T_2$ are larger than those in FIG. 3.

Figure 6:
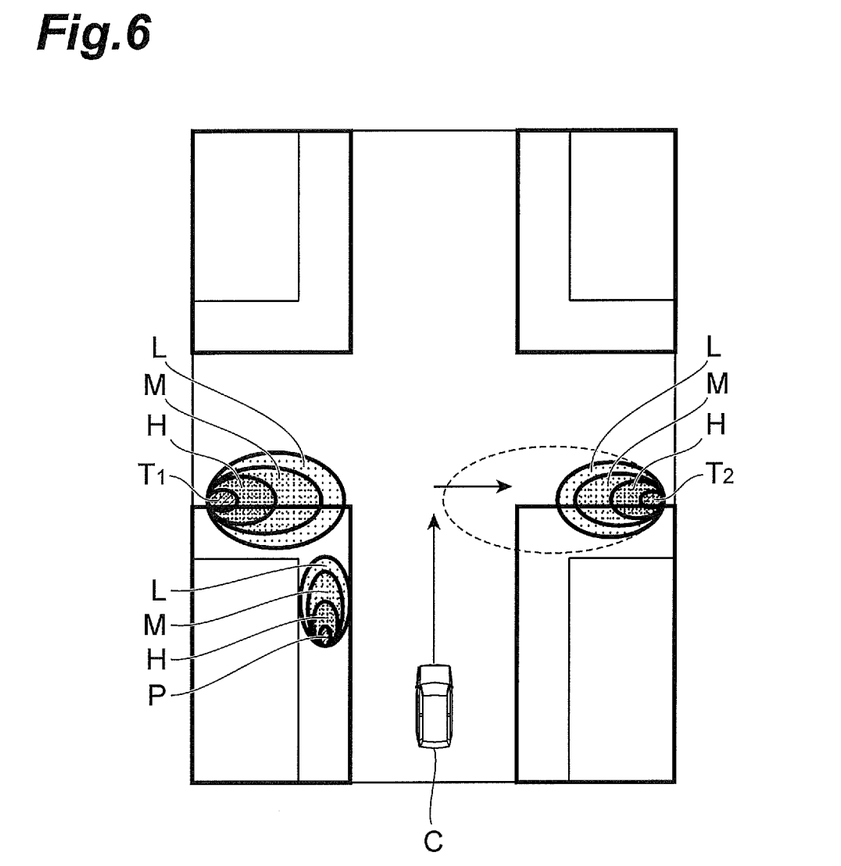
FIG. 6 is a diagram illustrating an example of a risk map in a case where a risk potential bias setting unit detects that "the width of a crossing road is 80% to 120% of the width of a traveling road" as a detected event.

Further, for example, in a case where "the width of a crossing road is 80% to 120% of the width of a traveling road", since the driver tends to estimate that the risk potential at the point is high, the risk potential bias is set to "−b %". FIG. 6 is a diagram illustrating an example of a risk map in a case where the risk potential bias setting unit 13 detects that "the width of a crossing road is 80% to 120% of the width of a traveling road" as a detected event. In this case, since the risk potential bias setting unit 13 sets the risk potential bias to "−b %", the risk potential estimating unit 10 changes the risk potential to a lower value according to the set risk potential bias. Accordingly, the risk potential regions L, M and H relating to the risk body $T_2$ are smaller than those in FIG. 3.

The risk potential bias updating unit 15 is a unit that adds and updates a record of predetermined content in the risk potential bias DB 14, in a case where an event detected on the basis of various information acquired from the object detecting unit 2, the traffic environment information acquiring unit 3, the driver operation detecting unit 4 and the traveling status detecting unit 5 complies with a preset predetermined condition. Further, the driving history storage unit 16 is a unit that stores information relating to a driving history detected by the risk potential bias updating unit 15.

The risk potential bias updating unit 15 records and accumulates information relating to the driving history acquired from the object detecting unit 2, the traffic environment information acquiring unit 3, the driver operation detecting unit 4 and the traveling status detecting unit 5, in diving history storage unit 16. The storage of the driving history using the risk potential bias updating unit 15 and the addition and updating of the record in the risk potential bias DB 14 will be described with reference to FIGS. 7A and 7B and FIGS. 8A and 8B.

Figure 7:
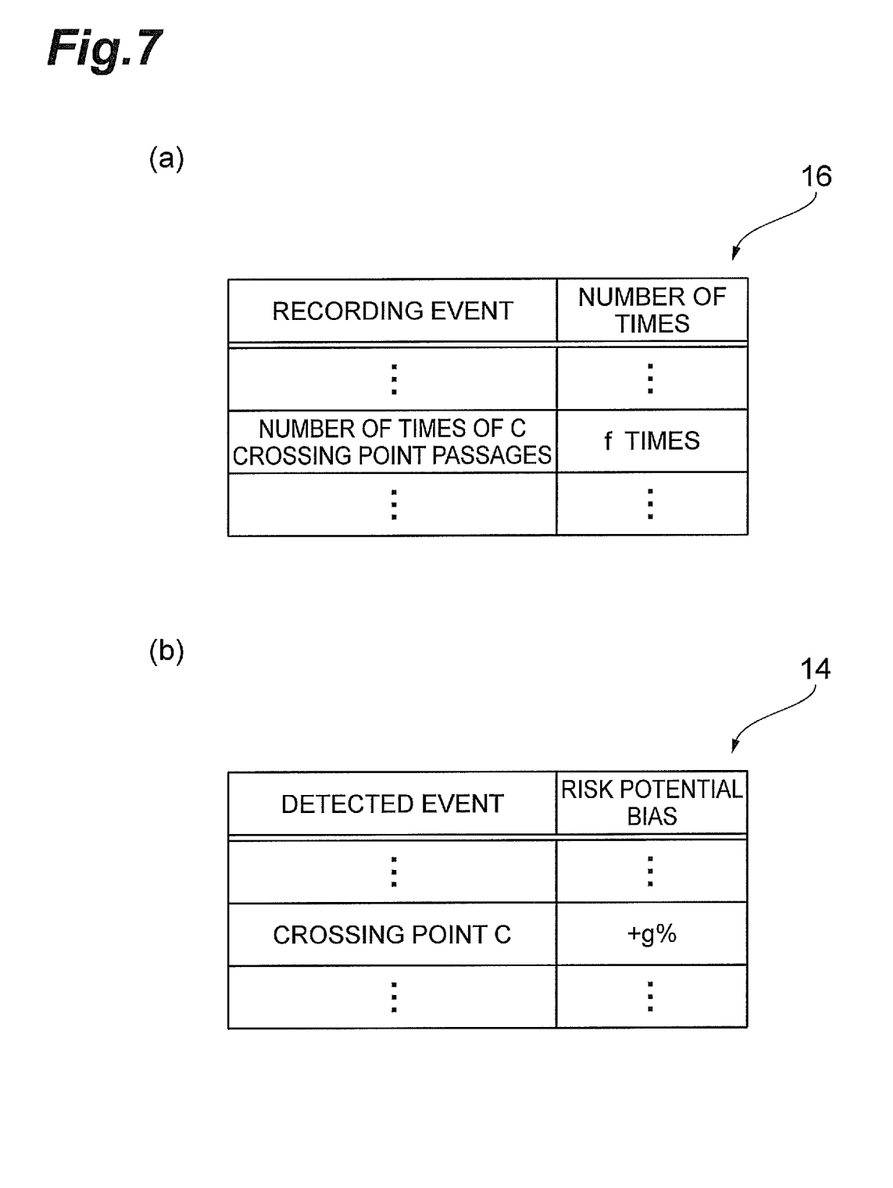
FIG. 7A is a diagram illustrating an example of a configuration of a driving history storage unit and data stored therein.
FIG. 7B is a diagram illustrating an example of a record added in a risk potential bias DB by a risk potential bias updating unit.

FIG. 7A is a diagram illustrating an example of a configuration of the driving history storage unit 16 and data stored therein. Further, FIG. 7B is a diagram illustrating an example of a record added in the risk potential bias DB 14 by risk potential bias updating unit 15. For example, the risk potential bias updating unit 15 records the number of times that a vehicle passes through a "C crossing point" in the driving history storage unit 16. The driving history storage unit 16 illustrated in FIG. 7A stores the number of times "f" in accordance with "the number of C crossing point passages" that is a recorded event. In a case where the number of times "f" is equal to or greater than a predetermined number of times that is set in advance, the risk potential bias updating unit 15 adds a record in which the "C crossing point" that is a detected event and a risk potential bias "+g %" are matched with each other, in the risk potential bias DB 14, as shown in FIG. 7B. Due to the record addition, in a case where the vehicle passes through the C crossing point, the risk potential bias setting unit 13 sets the risk potential bias to "+g %", and the risk potential estimating unit 10 increases the risk potential on the basis of the set risk potential bias.

Generally, in a case where a driver travels through a certain point a large number of times, the driver tends to estimate that the risk potential at the point is low. According to the risk potential bias setting and risk potential change processes described with reference to FIGS. 7A and 7B, in a case where the number of times that a vehicle travels through a specific point is equal to or greater than a predetermined number of times, a risk potential bias relating to the specific point for increasing a value of the risk potential is set, and the value of the risk potential is changed on the basis of the set risk potential bias. Accordingly, the tendency that the driver estimates that the risk is low is reflected in the risk potential, and thus, it is possible to estimate an appropriate risk potential.

Figure 8:
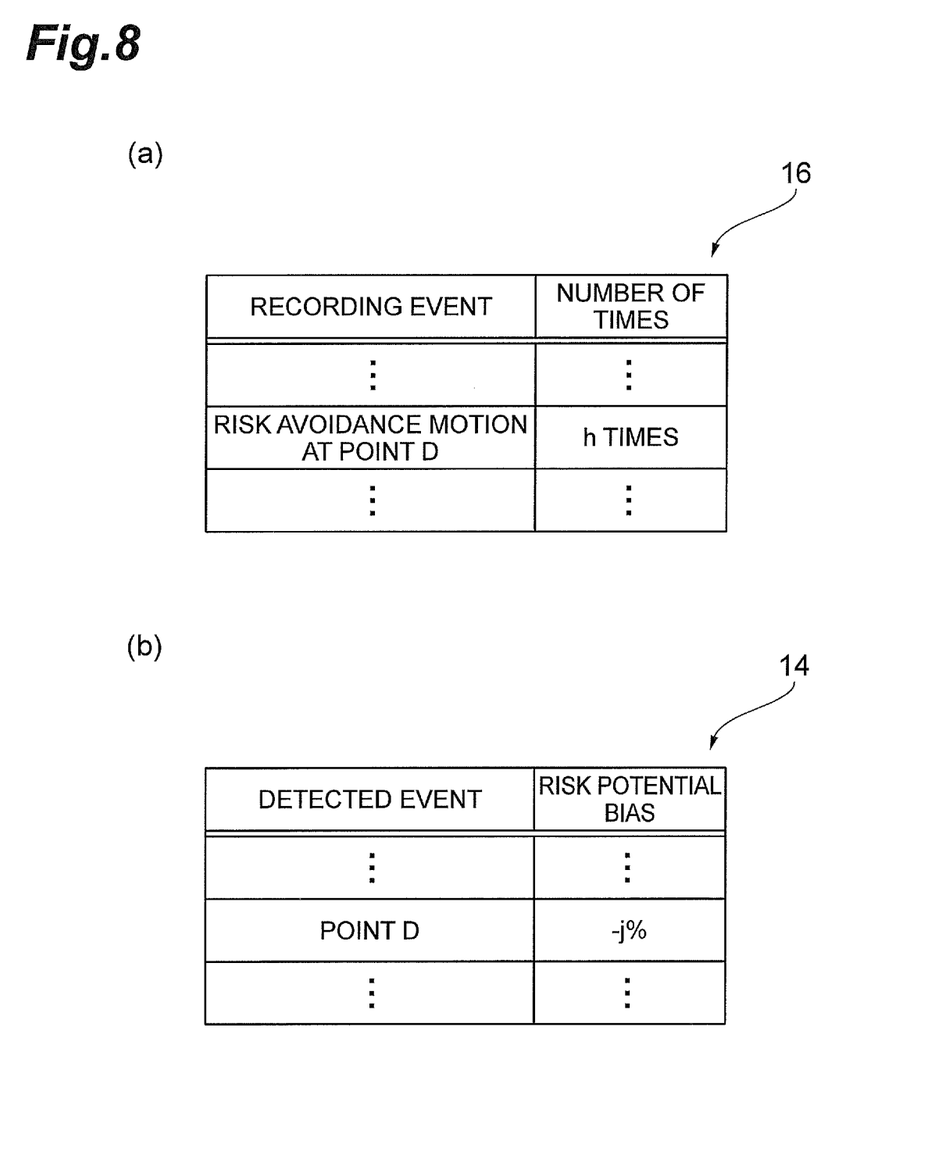
FIG. 8A is a diagram illustrating an example of a configuration of a driving history storage unit and data stored therein.
FIG. 8B is a diagram illustrating an example of a record added in a risk potential bias DB by a risk potential bias updating unit.

FIG. 8A is a diagram illustrating an example of a configuration of the driving history storage unit 16 and data stored therein. Further, FIG. 8B is a diagram illustrating an example of a record added in the risk potential bias DB 14 by the risk potential bias updating unit 15. The risk potential bias updating unit 15 records the number of times that a driver performs a risk avoidance motion in a "D point", for example, in the driving history storage unit 16. The driving history storage unit 16 illustrated in FIG. 8A stores the number of times "h" in accordance with the "risk avoidance motion at point D" that is a recorded event. In a case where the number of times "h" is equal to or greater than a predetermined number of times that is set in advance, the risk potential bias updating unit 15 adds a record in which the "D point" that is a detected event and a risk potential bias "−j %" are matched with each other to the risk potential bias DB 14, as shown in FIG. 8B. Due to the addition to the record, in a case where the vehicle passes through the D point, the risk potential bias setting unit 13 sets the risk potential bias to "−j %", and the risk potential estimating unit 10 decreases the risk potential on the basis of the set risk potential bias.

Generally, at a point where a driver frequently performs a driving operation for avoiding a risk, there is a high possibility that the driver travels through the concerned point while paying excessive attention. According to the risk potential bias setting and risk potential change processes described with reference to FIGS. 8A and 8B, in a case where the number of times of the driving operations of the driver for avoiding a risk at a specific point is equal to or greater than a predetermined number of times, a risk potential bias relating to the specific point for decreasing the value of the risk potential is set, and the value of the risk potential is changed on the basis of the set risk potential bias. Accordingly, the tendency that the driver estimates that the risk is high is reflected in the risk potential, and thus, it is possible to estimate an appropriate risk.

Further, at a different point that has the same characteristic relating to a traffic environment as at a specific point where the number of times of driving operations of a driver for avoiding a risk is equal to or greater than a predetermined number of times, there is a high possibility that the driver travels through the concerned point while paying excessive attention in a similar way to the specific point. In order to correct the excessive attention of the driver, the risk potential bias updating unit 15 is able to set a risk potential bias for changing the risk potential to be low, at the different point that has the same characteristic relating to a traffic environment as at a specific point where the number of times of driving operations of the driver for avoiding the risk is equal to or greater than the predetermined number of times. Specifically, the risk potential bias updating unit 15 extracts a characteristic relating to a traffic environment at a specific point indicated by the detected event of the record added in the risk potential bias DB 14. Subsequently, the risk potential bias updating unit 15 extracts a different point having the same characteristic relating to a traffic environment as the specific point, on the basis of various information acquired from traffic environment information acquiring unit 3. Further, the risk potential bias updating unit 15 matches the same risk potential bias as in the specific point with the different point and adds a record in which the different point is a detected event in the risk potential bias DB 14. Due to the record addition, the risk potential bias setting unit 13 sets a risk potential bias for decreasing the risk potential to be low with respect to the different point. Further, the risk potential estimating unit 10 is able to change the risk potential at the different point to a lower value on the basis of the set risk potential bias. Accordingly, the tendency that the driver estimates that the risk is high is reflected in the risk potential, and thus, it is possible to estimate an appropriate risk.

Figure 9:
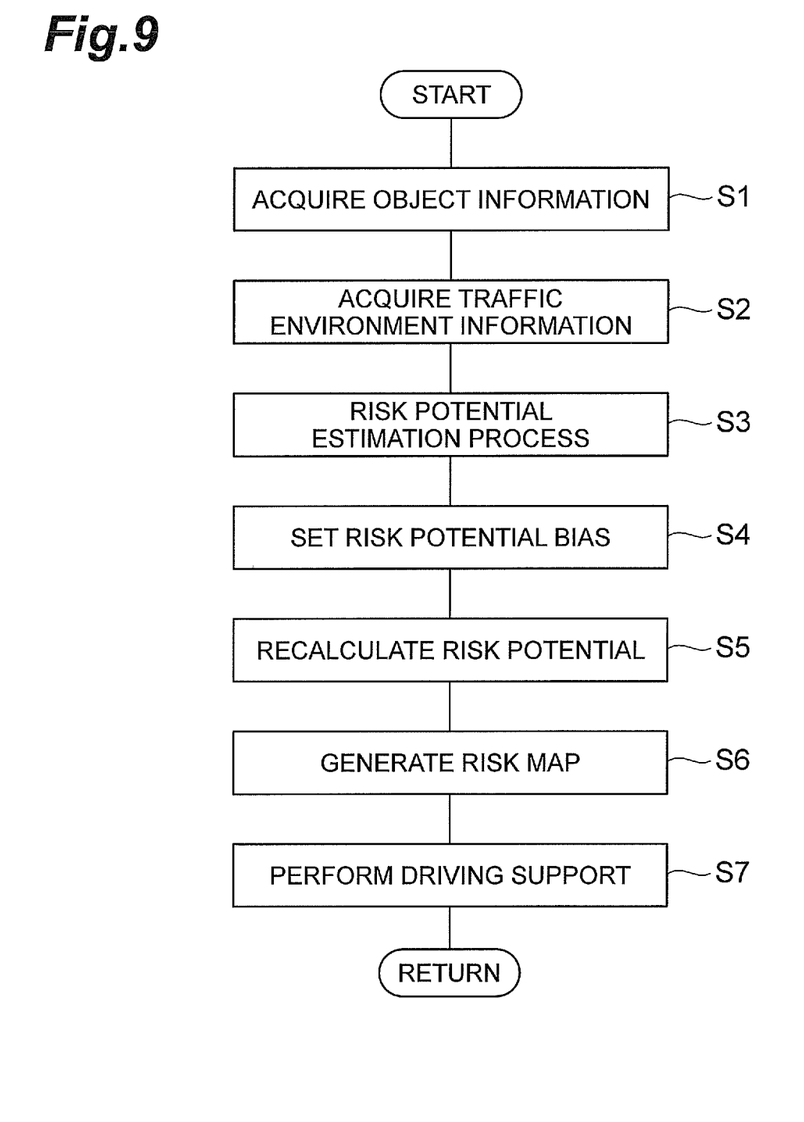
FIG. 9 is a flowchart illustrating the content of a driving support process in a driving support device.

Next, processing details performed in the driving support device 1 will be described with reference to FIG. 9. FIG. 9 is a flowchart illustrating the content of a driving support process in the driving support device 1.

Firstly, in step S1, the object detecting unit 2 detects an object that becomes a risk target in driving a vehicle and transmits information relating to the detected object to the control ECU 6. Subsequently, in step S2, the traffic environment information acquiring unit 3 acquires traffic environment information and transmits the detected traffic environment information to the control ECU 6.

Next, in step S3, the risk potential estimating unit 10 estimates a risk potential on the basis of various information acquired from the object detecting unit 2 and the traffic environment information acquiring unit 3. In a subsequent step S4, the risk potential bias setting unit 13 sets a risk potential bias on the basis of various information acquired from the object detecting unit 2, the traffic environment information acquiring unit 3, the driver operation detecting unit 4 and the traveling status detecting unit 5, with reference to the risk potential bias DB 14.

In step S5, the risk potential estimating unit 10 recalculates a risk potential on the basis of the risk potential bias set by the risk potential bias setting unit 13 and the risk potential estimated in step S3.

In step S6, the risk map generating unit 11 generates a risk map on the basis of the risk potential calculated in step S5. Further, in step S7, the driving support control unit 12 controls the devices including the display unit 7, the sound output unit 8 and the various actuators 9 on the basis of the risk map and a target route generated from the risk map, to perform driving support.

In the driving support device 1 according to the first exemplary embodiment described above, the risk potential bias is set by the risk potential setting unit 13 on the basis of the risk determination tendency of the driver, and the risk potential is changed by the risk potential estimating unit 10 on the basis of the set risk potential bias. Accordingly, the determination tendency of the driver is reflected in the risk potential. Accordingly, it is possible to perform a driving support in consideration of the risk determination tendency of the driver.

Second Exemplary Embodiment

Next, a second exemplary embodiment of the invention will be described. In the first exemplary embodiment, in a case where the traffic environment acquired from the traffic environment information acquiring unit 3 corresponds to the detected event stored in the risk potential bias DB 14, the risk potential bias setting unit 13 sets the risk potential bias corresponding to the detected event. On the other hand, in the second exemplary embodiment, the risk potential bias setting unit 13 sets a risk potential bias in further consideration of a traveling status of a vehicle detected by the traveling status detecting unit 5.

Figure 10:
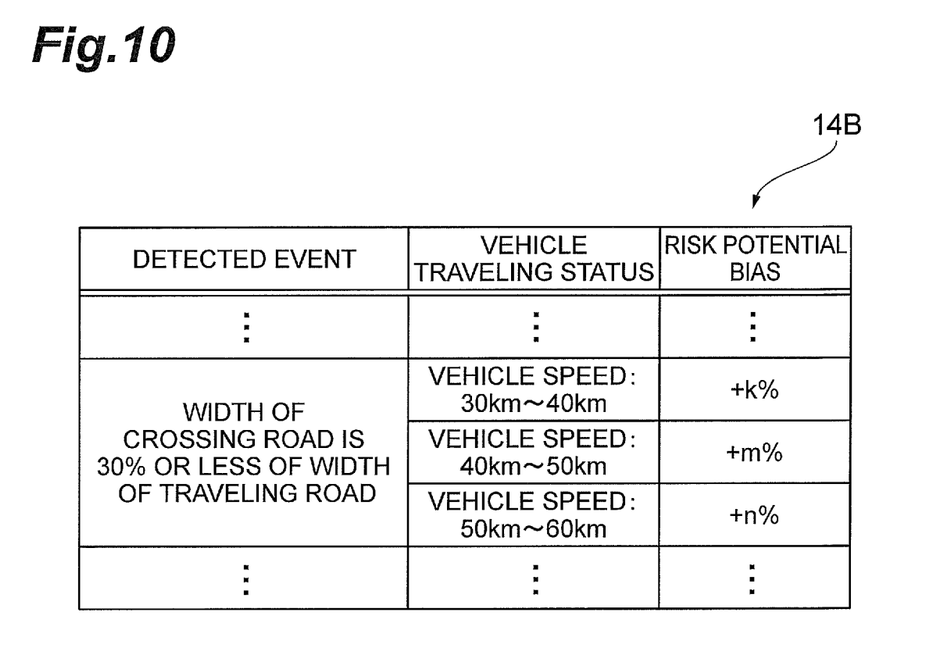
FIG. 10 is a diagram illustrating an example of a configuration of a risk potential bias DB and data stored therein, according to a second exemplary embodiment.

FIG. 10 is a diagram illustrating an example of a configuration of the risk potential bias DB 14B and data stored therein, according to the second exemplary embodiment. As shown in FIG. 10, the risk potential bias DB 14B stores the "risk potential bias", and the "detected event" and the "vehicle traveling status" relating to the traffic environment to be matched with each other. The risk potential bias setting unit 13 extracts the matched risk potential bias on the basis of the information relating to the traffic environment acquired from the traffic environment information acquiring unit 3 and the information relating to the traveling status of the vehicle acquired from the traveling status detecting unit 5, with reference to the risk potential bias DB 14B, and sets the extracted risk potential bias. For example, in a case where the traffic environment acquired from the traffic environment information acquiring unit 3 is "the width of a crossing road is 30% or less of the width of a traveling road" and the vehicle traveling status acquired from the traveling status detecting unit 5 is "vehicle speed: 45 km", the risk potential bias setting unit 13 sets the risk potential bias to "+m %".

In the driving support device 1 according to the second exemplary embodiment, the risk potential bias, in which the vehicle traveling status in addition to the traffic environment is also considered, is set, and the risk potential is changed on the basis of the set risk potential bias. Accordingly, since the vehicle traveling status is reflected in the risk potential and the risk map in which the vehicle traveling status is reflected is generated, it is possible to perform a more appropriate driving support.

Third Exemplary Embodiment

Next, a third exemplary embodiment of the invention will be described. In the first exemplary embodiment, in a case where the traffic environment acquired from the traffic environment information acquiring unit 3 corresponds to the detected event stored in the risk potential bias DB 14, the risk potential bias setting unit 13 sets the risk potential bias corresponding to the detected event. On the other hand, in the third exemplary embodiment, the risk potential bias setting unit 13 sets a risk potential bias in further consideration of a driver's status and a driving operation detected by the driver operation detecting unit 4.

Figure 11:
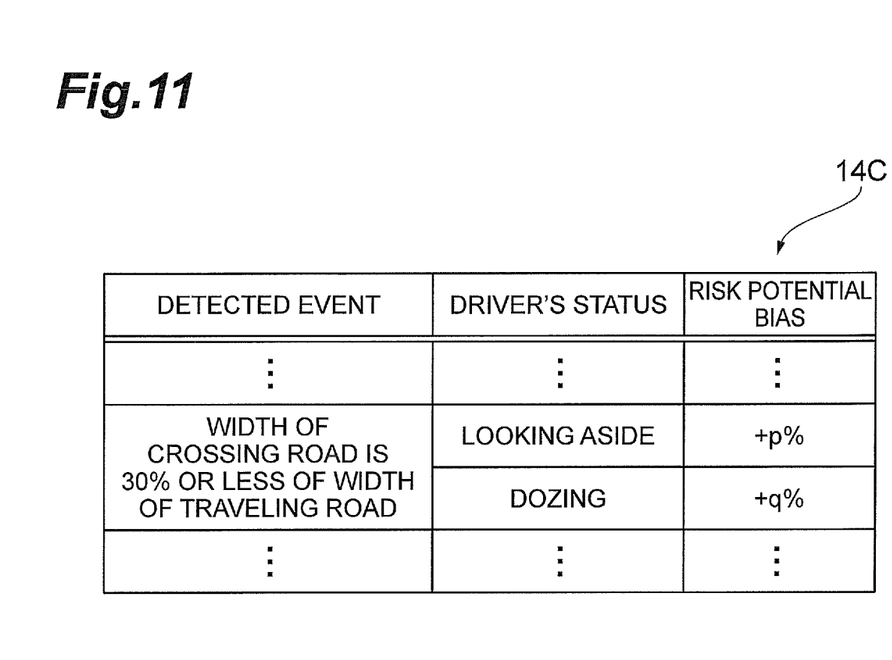
FIG. 11 is a diagram illustrating an example of a configuration of a risk potential bias DB and data stored therein, according to a third exemplary embodiment.

FIG. 11 is a diagram illustrating an example of a configuration of a risk potential bias DB 14C and data stored therein, according to the third exemplary embodiment. As illustrated in FIG. 11, the risk potential bias DB 14C stores the "risk potential bias", and the "detected event" and the "driver's status" relating to the traffic environment to be matched with each other. The risk potential bias setting unit 13 extracts the matched risk potential bias on the basis of the information relating to the traffic environment acquired from the traffic environment information acquiring unit 3 and the information relating to the driver's status acquired from the driver operation detecting unit 4, with reference to the risk potential bias DB 14C, and sets the extracted risk potential bias. For example, in a case where the traffic environment acquired from the traffic environment information acquiring unit 3 is "the width of a crossing road is 30% or less of the width of a traveling road" and the driver's status acquired from the driver operation detecting unit 4 is "looking aside", the risk potential bias setting unit 13 sets the risk potential bias to "+p %".

In the driving support device 1 according to the third exemplary embodiment, the risk potential bias, in which the driver's status in addition to the traffic environment is also considered, is set, and the risk potential is changed on the basis of the set risk potential bias. Accordingly, the driver's status is reflected in the risk potential and a risk map to which the driver's status is reflected is generated, and thus, it is possible to perform more appropriate driving support.

The risk potential bias DB 14C may store the "risk potential bias", and the "detected event", the "vehicle traveling status" and the "driver's status" to be matched with each other, and the risk potential bias setting unit 13 may use both of the "vehicle traveling status" and the "driver's status" for extraction of the risk potential bias from the risk potential bias DB 14C.

The above-described respective exemplary embodiments are examples of the driving support device according to the invention, and the driving support device according to the invention is not limited to the description of the present exemplary embodiments. In the driving support device according to the invention, the driving support device 1 according to the exemplary embodiments may be modified in a range without changing the spirit disclosed in respective claims, or may be applied to other devices.

INDUSTRIAL APPLICABILITY

According to the present invention, it is possible to realize a driving support in consideration of a risk potential determination tendency of a driver.

REFERENCE SIGNS LIST

1 DRIVING SUPPORT DEVICE
2 OBJECT DETECTING UNIT
3 TRAFFIC ENVIRONMENT INFORMATION ACQUIRING UNIT
4 DRIVER OPERATION DETECTING UNIT
5 TRAVELING STATUS DETECTING UNIT
7 DISPLAY UNIT
8 SOUND OUTPUT UNIT
9 VARIOUS ACTUATORS
10 RISK POTENTIAL ESTIMATING UNIT
11 RISK MAP GENERATING UNIT
12 DRIVING SUPPORT CONTROL UNIT
13 RISK POTENTIAL BIAS SETTING UNIT
14, 14B, 14C RISK POTENTIAL BIAS DB
15 RISK POTENTIAL BIAS CHANGING UNIT
16 DRIVING HISTORY STORING UNIT
6 CONTROL ECU
H HIGH RISK POTENTIAL REGION
M INTERMEDIATE RISK POTENTIAL REGION
L LOW RISK POTENTIAL REGION
P PEDESTRIAN
$T_1, T_2$ RISK BODY

The invention claimed is:

1. A driving support device that estimates a risk potential that is the degree of a risk with respect to a risk target in driving of a vehicle and performs driving support for a driver of the vehicle on the basis of the estimated risk potential, comprising:

a risk bias setting unit configured to set a risk potential bias that is a value for changing the risk potential on the basis of a risk potential determination tendency of the driver; and a risk potential estimation unit configured to change the risk potential on the basis of the risk potential bias set by the risk potential bias setting unit, wherein the risk potential bias setting unit sets, in a case where the number of times that a driving operation for avoiding a risk at a specific point is performed by the driver is equal to or greater than a predetermined number of times that is set in advance, the risk potential bias for decreasing the risk potential relating to the specific point, and wherein the risk potential estimation unit changes the risk potential at the specific point into a smaller value on the basis of the risk potential bias set by the risk potential bias setting unit.

2. The driving support device according to claim 1, wherein the risk potential bias setting unit extracts a characteristic relating to a traffic environment at the specific point and sets, in a case where a point different from the specific point has the characteristic relating to the traffic environment, the risk potential bias for decreasing the risk potential relating to the different point, and wherein the risk potential estimation unit changes the risk potential at the different point into a smaller value on the basis of the risk potential bias set by the risk potential bias setting unit.

* * * * *